US012203649B2

(12) United States Patent
Yokobayashi et al.

(10) Patent No.: US 12,203,649 B2
(45) Date of Patent: Jan. 21, 2025

(54) WAVELENGTH CONVERSION DEVICE AND ILLUMINATION DEVICE

(71) Applicants: KYOTO UNIVERSITY, Kyoto (JP); STANLEY ELECTRIC CO., LTD., Tokyo (JP)

(72) Inventors: Yusuke Yokobayashi, Tokyo (JP); Yasuyuki Kawakami, Tokyo (JP); Yosuke Maemura, Tokyo (JP); Shunsuke Murai, Kyoto (JP)

(73) Assignees: STANLEY ELECTRIC CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 18/685,316

(22) PCT Filed: Aug. 25, 2022

(86) PCT No.: PCT/JP2022/032040
§ 371 (c)(1),
(2) Date: Feb. 21, 2024

(87) PCT Pub. No.: WO2023/027144
PCT Pub. Date: Mar. 2, 2023

(65) Prior Publication Data

US 2024/0384858 A1 Nov. 21, 2024

(30) Foreign Application Priority Data

Aug. 25, 2021 (JP) ................................ 2021-136909

(51) Int. Cl.
*F21V 9/32* (2018.01)
*F21V 9/45* (2018.01)
(Continued)

(52) U.S. Cl.
CPC .................. *F21V 9/32* (2018.02); *F21V 9/45* (2018.02); *F21Y 2105/10* (2016.08); *F21Y 2115/30* (2016.08)

(58) Field of Classification Search
CPC .......... F21V 9/32; F21V 9/45; F21Y 2115/30; F21Y 2105/10
See application file for complete search history.

(56) References Cited

U.S. PATENT DOCUMENTS 9,157,605 B2 10/2015 Rodriguez et al.
10,732,328 B2 8/2020 Murai et al.
(Continued)

FOREIGN PATENT DOCUMENTS

JP 6063394 B2 1/2017
JP 2018013688 A 1/2018
(Continued)

OTHER PUBLICATIONS

International Search Report (ISR) (and English language translation thereof) dated Oct. 4, 2022, issued in International Application No. PCT/JP2022/032040.
(Continued)

*Primary Examiner* — Zheng Song
(74) *Attorney, Agent, or Firm* — Holtz, Holtz & Volek PC

(57) ABSTRACT

A wavelength conversion device includes a wavelength converter having a plate shape and a plurality of antennas. The wavelength converter converts a wavelength of incident light and generates wavelength-converted light and emits the wavelength-converted light. The plurality of antennas are disposed on a light-emitting surface of the wavelength converter. The plurality of antennas form an antenna array in a first region of the light-emitting surface. The respective plurality of antennas are arranged with a predetermined period in the first region. The antenna array is absent in a second region outside the first region. An optical path length from a light-receiving surface of the wavelength converter to the light-emitting surface of the incident light that reaches a light-emitting surface of the first region is longer than an optical path length from the light-receiving surface to the light-emitting surface of the incident light that reaches a light-emitting surface of the second region.

14 Claims, 16 Drawing Sheets

(51) Int. Cl.
*F21Y 105/10* (2016.01)
*F21Y 115/30* (2016.01)

(56) References Cited

U.S. PATENT DOCUMENTS

| | | | | |
|---|---|---|---|---|
| 10,907,773 | B2 | 2/2021 | Murai et al. | |
| 2017/0350563 | A1* | 12/2017 | Lunz | F21K 9/64 |
| 2019/0113727 | A1* | 4/2019 | Tamma | H01L 33/58 |
| 2020/0025341 | A1 | 1/2020 | Murai et al. | |
| 2020/0142209 | A1* | 5/2020 | Dal Negro | G02B 27/42 |
| 2020/0203585 | A1 | 6/2020 | Lopez-Julia et al. | |
| 2021/0033756 | A1 | 2/2021 | Matsuki | |

FOREIGN PATENT DOCUMENTS

| | | | | | |
|---|---|---|---|---|---|
| JP | 2019176105 | A | * | 10/2019 | |
| JP | 2020012939 | A | | 1/2020 | |
| JP | 2021021906 | A | | 2/2021 | |
| WO | WO-2015019220 | A1 | * | 2/2015 | H01L 33/504 |
| WO | WO-2015019229 | A1 | * | 2/2015 | G02B 5/008 |
| WO | WO-2015181034 | A1 | * | 12/2015 | F21K 9/20 |

OTHER PUBLICATIONS

Written Opinion dated Oct. 4, 2022, issued in International Application No. PCT/JP2022/032040.

* cited by examiner

WAVELENGTH CONVERSION DEVICE AND ILLUMINATION DEVICE

TECHNICAL FIELD

The present invention relates to a wavelength conversion device that converts a wavelength of light and an illumination device including the wavelength conversion device.

BACKGROUND ART

Conventionally, an illumination device in which a light source that discharges light of a predetermined spectrum and a wavelength conversion device that converts a wavelength of the light from the light source and outputs the light are combined, and mixes blue-color emitted light and yellow-color emitted light (complementary color) is known. In addition, for example, in Patent Documents 1 and 2, an illumination device that uses a wavelength converter and an antenna array as an illumination device that improves directivity of an emitted light is disclosed.

Patent Document 1: Japanese Unexamined Patent Application Publication No. 2018-13688 (Japanese Patent No. 6789536)

Patent Document 1: Japanese Patent No. 6063394

DISCLOSURE OF THE INVENTION

Problems to be Solved by the Invention

Light that is incident on an antenna array of a phosphor plate at a large angle from the inside with respect to a light-emitting surface of the antenna array is relatively easily extracted to the outside by an antenna function (resonance through localized surface plasmon resonance and optical diffraction). Since phosphor has a high refractive index, when a primary light of the emitted light is incident on the phosphor plate, the primary light is aligned in an optical axis direction (direction perpendicular to the light-emitting surface). Accordingly, a part of the primary light that has reached the light-emitting surface without being wavelength converted to a secondary light reaches the light-emitting surface at a small incidence angle that is unlikely to be influenced by the antenna function. The primary light that has reached the light-emitting surface of the phosphor plate is absorbed or reflected rearward by the antenna array and becomes lost.

Since the antenna array is constituted of a plurality of antennas of metal (pillars) arranged periodically, generally, 5 to 50% of the light-emitting surface is blocked by the antenna array. In other words, up to half of the primary light that has reached the light-emitting surface is absorbed or reflected rearward by the antenna array, and does not get extracted to the outside, which is a first problem.

The present invention has been made in consideration of the above points, and an object of which is to provide a wavelength conversion device that allows improving light extraction efficiency and an illumination device that includes the wavelength conversion device.

Solutions to the Problems

The wavelength conversion device according to the present invention includes a wavelength converter having a plate shape and a plurality of antennas. The wavelength converter has a light-receiving surface and a light-emitting surface. The wavelength converter converts a wavelength of incident light that is incident from the light-receiving surface and generates a wavelength-converted light. The wavelength converter emits the wavelength-converted light from the light-emitting surface. The plurality of antennas are disposed on the light-emitting surface of the wavelength converter. The plurality of antennas form an antenna array in a first region of the light-emitting surface. The respective plurality of antennas are arranged with a predetermined period in the first region. The antenna array is absent in a second region outside the first region. An optical path length from the light-receiving surface to the light-emitting surface of the incident light that reaches a light-emitting surface of the first region is longer than an optical path length from the light-receiving surface to the light-emitting surface of the incident light that reaches a light-emitting surface of the second region.

Furthermore, an illumination device according to the present invention includes the wavelength conversion device and a light source that generates light to be incident on a phosphor plate.

BRIEF DESCRIPTION OF THE DRAWINGS

FIG. 12 is a schematic cross-sectional view illustrating a configuration of a modification of the wavelength conversion device in Embodiment 1.

DESCRIPTION OF PREFERRED EMBODIMENTS

The following describes embodiments of the present invention in detail.

Embodiment 1

Figure 1:
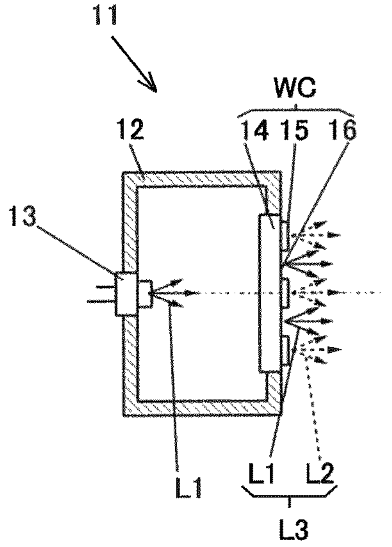
FIG. 1 is a schematic cross-sectional view including an optical axis of a light source illustrating a configuration of an illumination device according to Embodiment 1.

FIG. 1 is a schematic cross-sectional view illustrating a configuration of an illumination device 11 according to Embodiment 1. Note that, in the following cross-sectional view, hatchings of optical components are omitted.

The illumination device 11 includes a light source 13 housed in a casing 12 and a wavelength conversion device WC disposed on an optical axis of the light source 13, and can be used as a light source of, for example, a projector, a vehicle lamp, a general illumination device, or the like. The illumination device 11 emits an illumination light L3 (primary light L1 (excitation light) and a secondary light L2 (wavelength-converted light) to the outside from an outward-facing surface of the wavelength conversion device WC. An optical system (not illustrated) that projects the illumination light L3 may be provided on outward-facing surface side of the illumination device 11.

The casing 12 is provided with an opening that fixes the light source 13 and an opening that fixes the wavelength conversion device WC. The wavelength conversion device WC includes antenna array portions 15 (first regions) and non-antenna array portions 16 (second regions) arranged in parallel on an outward-facing surface of the casing 12.

(Light Source)

The light source 13 emits the primary light L1 of an excitation light of a predetermined wavelength range. The light source 13 includes, for example, a semiconductor laser as the laser element. As the light source 13, for example, an InGaN-based edge emitting laser (EEL) that emits light (blue light) having a peak wavelength in a range of 440 nm to 460 nm is used. For example, as the light source 13, besides EEL, semiconductor lasers such as a vertical cavity surface emitting laser (VCSEL) or a photonic crystal surface emitting laser (PCSEL) can be used. The semiconductor lasers are preferred as the light source 13 because they have high directivity, have high incidence efficiency on the wavelength conversion device WC, and can become a narrow angle white light together with the secondary light L2 having directivity that is increased by the antenna array portion 15.

The light source 13 is preferably disposed such that the primary light L1 is incident from a light-receiving surface S1 of the wavelength conversion device WC (side opposite to a light-emitting surface S2 on which the antenna array portions 15 are formed) (see FIG. 1).

Here, a second problem will be described. Light distribution (emission angle) of the light extracted by the antenna function varies depending on the wavelength or the incidence angle to the light-emitting surface, and it is difficult to match the light distributions of the primary light and the secondary light under the same antenna array. Moreover, the primary light is unlikely to be influenced by the antenna function, and the light distribution (directivity) of the light source before the primary light is incident on the phosphor plate is maintained even after the primary light is emitted from the phosphor plate. Generally, in order to increase the incidence efficiency on the phosphor plate, it is preferable to collimate the primary light or shape the primary light into a radiation angle that is as narrow as possible. From these reasons, the primary light is often extracted from the phosphor plate at a radiation angle narrower than that of the secondary light, and as a result, there is a risk of color separation, such as a color temperature decreasing outwardly from the center, occurring in the illumination light.

Therefore, either when a light-emitting diode or a semiconductor laser is used as the light source 13, a predetermined optical system (not illustrated) may be disposed between the light source 13 and the wavelength conversion device WC in order to adjust the primary light L1 to a desired light distribution (Far Field Pattern: FFP), such as the same light distribution as the secondary light. For example, the light source 13 is constituted of a light-emitting diode and a condensing optical system, such as a convex lens, which adjusts the light distribution of light from the light-emitting diode and generates incident light of the primary light. Accordingly, the above-described second problem can be expected to be solved.

Furthermore, an integral optical system may be disposed between the light source 13 and the wavelength conversion device WC, and an irradiation intensity distribution (near field pattern: NFP) of the primary light L1 in a phosphor plate 14 (wavelength converter) may be adjusted, for example, to a top-hat type intensity distribution. Thus, temperature quenching caused by local heat generation of the phosphor plate 14 can be suppressed, and wavelength change efficiency can be improved.

(Wavelength Conversion Device)

The wavelength conversion device WC includes the phosphor plate 14 having a plate shape with the optical axis of the light source 13 as the normal line, and the antenna array portions 15 (first regions) and the non-antenna array portions 16 (second regions) arranged together in parallel on a main surface on a side opposite to the light source 13 of the phosphor plate 14.

The phosphor plate 14 disposed on an optical path of the primary light L1 inside the casing 12 converts the wavelength of the primary light L1 incident from the light source 13, and generates the secondary light (wavelength-converted light) having a wavelength different from that of the primary light L1. Accordingly, the illumination light L3 includes the secondary light L2 in which the wavelength of the primary light L1 has been converted by the phosphor plate 14 and the primary light L1 that has been transmitted through the phosphor plate 14. The wavelength conversion device WC emits the secondary light L2 and the primary light L1 as the illumination light L3.

The antenna array portion 15 and the non-antenna array portion 16 are formed on the phosphor plate 14 and control the light distribution of the illumination light L3 emitted from the phosphor plate 14.

(Phosphor Plate)

Figure 2:
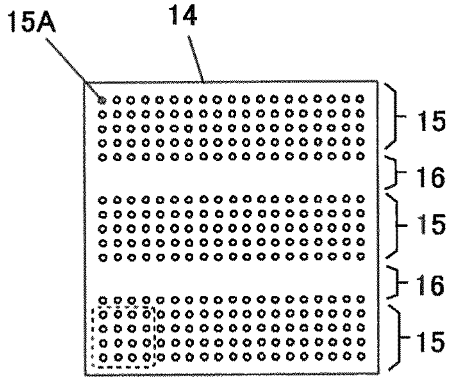
FIG. 2 is a front view of a wavelength conversion device in the illumination device according to Embodiment 1.
Figure 3:
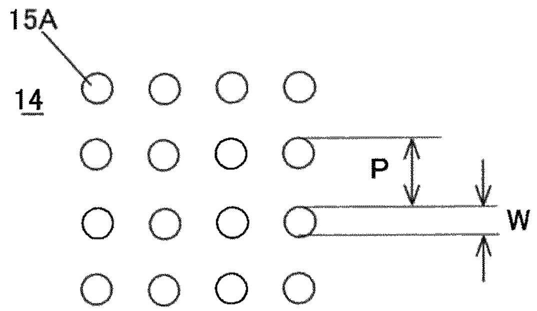
FIG. 3 is an enlarged partial front view of inside the dashed line frame in FIG. 2.
Figure 4:
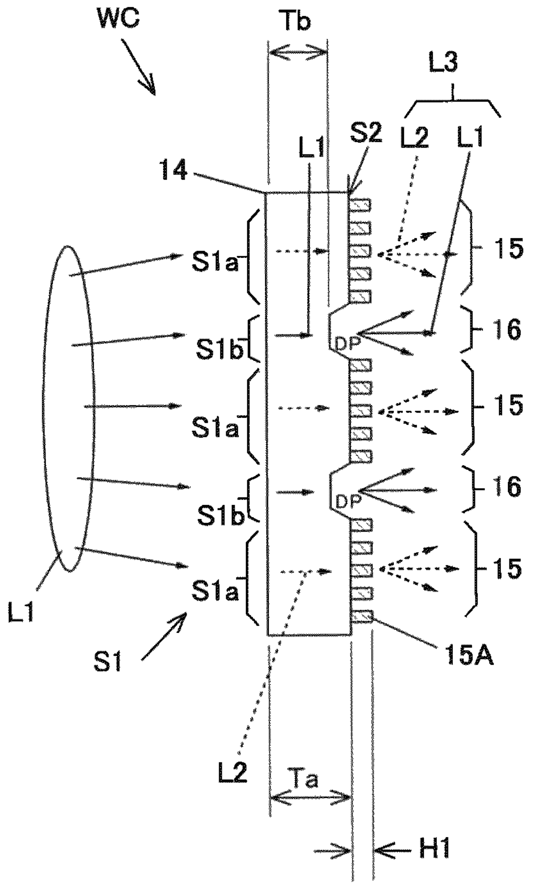
FIG. 4 is a schematic cross-sectional view including the optical axis of the light source illustrating a configuration of the wavelength conversion device in the illumination device according to Embodiment 1.

FIG. 2 is a front view of the wavelength conversion device of the illumination device according to Embodiment 1. FIG. 3 is an enlarged partial front view of inside the dashed lines in FIG. 2. FIG. 4 is a schematic enlarged cross-sectional view including the optical axis of the light source illustrating a configuration of the wavelength conversion device.

The phosphor plate 14 receives the primary light L1 from the light-receiving surface S1. The phosphor plate 14 converts the wavelength of the primary light L1 in the phosphor plate 14 and generates the secondary light L2. A part of the primary light L1 as the primary light L1 is transmitted through the phosphor plate 14. The phosphor plate 14 emits the illumination light L3, which includes the secondary light L2 and the primary light L1, from the light-emitting surface S2.

The phosphor plate 14 is made of a single-phase or a single-crystal phosphor plate, that is a ceramic plate, formed by sintering a phosphor material. For example, the phosphor plate 14 is made of a transparent ceramic plate formed by sintering a single-phase yttrium aluminum garnet (YAG:Ce) phosphor having cerium as a luminescence center. Since the single-phase YAG:Ce has a relatively high refractive index, the primary light L1 that is incident can be approximately parallelized in the phosphor plate 14. Therefore, the primary light L1 reaches the light-emitting surface S2 at a small incidence angle, the primary light L1 is efficiently extracted, and directivity is also maintained.

When the phosphor plate 14 is made of a transparent ceramic plate made of a single-phase phosphor, the primary light L1 is emitted from the phosphor plate 14 in the state of maintaining the light distribution characteristics of the primary light L1 that has been incident (having the same traveling direction before and after the transmission through the phosphor plate 14). Therefore, for example, when a laser beam from the light source 13 is incident on the phosphor plate 14 as the primary light L1, the primary light L1 has approximately the same light distribution characteristics as that of the laser beam.

For example, the phosphor plate 14 generates light (yellow light) in a wavelength band of 500 nm to 800 nm as the secondary light L2. Therefore, in the present embodiment, a mixture of the yellow light (secondary light L2) and the blue light (primary light L1), which is recognized as white light, is outputted from the light-emitting surface S2 of the phosphor plate 14 as the illumination light L3.

Note that the phosphor plate 14 is not limited to being made of the ceramic plate. For example, when not being intended to be used for a long time at a high temperature, the phosphor plate 14 may be made of a binder containing phosphor particles that is molded into a plate shape. For example, the phosphor plate 14 may be made of a transparent binder in which YAG:Ce phosphor powder is dispersed therein and fixed.

(Antenna Array Portion)

The antenna array portion 15 controls the light distribution of mainly the secondary light L2 among the illumination light L3. As illustrated in FIG. 2, the antenna array portion 15 is constituted of a plurality of optical antennas 15A (hereinafter, simply referred to as antennas) formed on a flat surface of the light-emitting surface S2 of the phosphor plate 14.

As illustrated in FIG. 2, the antenna array portions 15 are, for example, formed in parallel in a strip form with the non-antenna array portions 16 interposed therebetween. In order to obtain sufficient antenna function, the antenna array portion 15 in which the antenna array is formed is formed so as to have a width of 10 μm or more in any direction on the light-emitting surface S2. The light-emitting surface S2 and the light-receiving surface S1 that form the antenna array are flat and smooth surfaces having a surface roughness Ra of 10 nm or less, and preferably 1 nm or less.

As illustrated in FIG. 3, the plurality of antennas 15A are arranged with a predetermined period (antenna period) P that is sufficiently larger than the optical wavelength of the primary light L1 (excitation light) in the phosphor plate 14. The plurality of antennas 15A are arranged with the period P that corresponds to the wavelength of the secondary light L2 in the phosphor plate 14. The respective antennas 15A have the same order of antenna widths (diameters) W as each other. When the antenna 15A has a columnar, conical or pyramidal shape, the antenna width W refers to the maximum width of the antennas 15A.

Each of the antennas 15A is a nanosized and minute columnar, conical or pyramidal metal projection. Each of the antenna 15A has a columnar shape, and is made of a material having a plasma frequency in the visible region, such as Au (gold), Ag (silver), Cu (copper), Pt (platinum), Pd (palladium), Al (aluminum), or Ni (nickel), or an alloy or laminated body containing the material(s).

Furthermore, as illustrated in FIG. 4, the respective antennas 15A have the same order of antenna heights H1 as each other.

In the antenna array of the antennas 15A, for example, the antennas 15A are arranged in a square lattice with a period P of 400 nm in which each antenna is an Al pillar having an antenna diameter W of 220 nm, and an antenna height H1 of 220 nm. Thus, high antenna function can be exhibited with respect to the light emission (wavelength of 500 to 700 nm) of YAG:Ce, directivity is imparted to the secondary light L2, and the light extraction efficiency of the secondary light L2 is also improved.

The antenna array is not limited to the description above, and can be deformed according to the required directivity or the like. For example, the shape is not limited to a column (pillar), and may be a polygon, a rectangular column shape, or a conic solid shape. As the antenna array arrangement, besides the square lattice, a triangular lattice or a quasicrystal arrangement can also be used, and the period can also be changed according to the desired enhanced wavelength (chromaticity and color temperature). For example, the antenna array portion 15 may have a plurality of antenna array segments having different antenna periods P with each other. When YAG:Ce is used for the phosphor plate 14 as in the present case, the period of antenna array in a range of 250 to 500 nm (a realistic range considering the efficiency is 300 to 450 nm) near the (optical) wavelength can be used. Moreover, regarding the size and height of each antenna, depending on the required directivity and efficiency (enhanced efficiency and light extraction efficiency), the size (width and diameter) W is set as 50 to 300 nm, and the antenna height H1 is set as 50 to 300 nm.

When each antenna 15A of the antenna array portions 15 is irradiated with the secondary light L2, the strength of an electric field in the vicinity of the antennas 15A increases, owing to localized surface plasmon resonance at the surfaces of the antennas 15A. By setting the period P with which the antennas 15A are arranged on the order of the optical wavelength of the secondary light L2, the localized surface plasmon resonance of each of the adjoining individual antennas 15A cause resonance while generating optical diffraction, and the strength of the electric field in the vicinity of the antennas 15A further increases. Therefore, the light extraction efficiency of the secondary light L2 is improved.

As a result of the enhancement of the electric field, the secondary light L2 is amplified and emitted from the antenna array portions 15 with having narrow-angle light distribution characteristics (low etendue). In other words, the antenna array portion 15 has the functions of enhancing the secondary light L2 in the phosphor plate 14 and narrowing the emission direction of the secondary light L2, in addition to the function of improving the light extraction efficiency of the secondary light L2.

Note that, by the antenna period P being set on the same order of or slightly larger than the wavelength of target light (wavelength in the medium), the antenna array portion 15 produces high antenna function.

On the other hand, the antennas 15A are arranged with the period P sufficiently larger than the optical wavelength of the primary light L1 (excitation light) in the phosphor plate 14. Therefore, the antenna function is substantially not applied to the primary light L1. In other words, the primary light L1 is emitted from the antenna array portions 15 in the state of maintaining the light distribution characteristics (strength and shape) of the light source.

In other words, the antenna array portion 15 has the function of adjusting the strength and directivity of the secondary light L2 (for example, yellow light). On the other hand, the antenna array portion 15 passes the primary light L1 (for example, blue light) whose wavelength is not converted in the phosphor plate 14.

Thus, the antenna array portion 15 is configured so as to substantially apply the antenna function only on the secondary light L2. Therefore, the primary light L1 among the illumination light L3 is not influenced by the antenna function of the antenna array portion 15. However, a part of the primary light is absorbed or reflected rearward by the antenna array and becomes lost. Accordingly, the secondary light L2 is mainly discharged due to the antenna function from the antenna array portion 15.

In the present embodiment, the antenna array portion 15 has a thickness to the opposed light-receiving surface that is thicker than a thickness to the opposed light-receiving surface of the non-antenna array portion 16. In other words, the phosphor plate 14 is configured such the optical path length from the light-receiving surface S1 to the light-emitting surface S2 of the primary light L1 reaching the light-emitting surface S2 of the antenna array portion 15 is longer than the optical path length from the light-receiving surface S1 to the light-emitting surface S2 of the primary light L1 reaching the light-emitting surface S2 of the non-antenna array portion 16. Specifically, the phosphor plate 14 is configured such that the distance between a portion Sla of the light-receiving surface S1 opposed to the antenna array portion 15 of the light-emitting surface S2 and the antenna array portion 15 is greater than the distance between a portion S1*b* of the light-receiving surface S1 opposed to the non-antenna array portion 16 of the light-emitting surface S2 and the non-antenna array portion 16.

While the primary light L1 is incident such that the optical axis is perpendicular to the light-receiving surface S1, and both the portions Sla and Slb are irradiated, the lights emitted therefrom become different.

The thickness (distance Ta between the light-receiving surface Sla and the light-emitting surface S2) of the phosphor plate 14 in the regions in which the antenna array portions 15 are formed is 80 μm or more, for example. This allows approximately 50% or more of the primary light L1 that is incident to be converted to the secondary light L2, and the primary light L1 to be absorbed and reflected by the antenna array decreases compared with the conventional one. When the thickness is preferably 200 μm or more, approximately 90% of the primary light L1 is converted to the secondary light L2 before reaching the light-emitting surface S2, and the loss of the primary light L1 that is incident on the antenna array portion 15 can be considerably decreased to 3% or less.

(Non-antenna Array Portion)

The non-antenna array portion 16 mainly functions as a window portion that controls the light distribution of the primary light L1.

On the light-emitting surface S2 of the phosphor plate 14, in addition to the antenna array portions 15, the non-antenna array portions 16 in which the antenna array is not disposed and the phosphor plate 14 is exposed are formed.

A conversion proportion of the primary light L1 to the secondary light L2 in the non-antenna array portion 16 is lower than that in the antenna array portion 15, includes 0%, and is 80% or less.

The non-antenna array portion 16 is formed to be thinner than the antenna array portion 15, and when the thickness is 180 μm or less including zero thickness, the primary light L1 that has not been wavelength converted can be extracted as the illumination light. The thickness (distance Tb between the light-receiving surface S1*b* and the light-emitting surface S2) and the occupation area of the non-antenna array portion 16 can be determined so as to obtain the desired chromaticity and color temperature. The sizes thereof can be set by methods such as forming a recessed portion DP having a bottom surface of a predetermined depth that is parallel to the antenna array portion 15 of the light-emitting surface S2 on the light-emitting surface S2 side of the phosphor plate 14 by a general method, such as dicing or dry etching, or sintering to obtain a desired recessed shape using a metallic mold or the like when manufacturing the phosphor plate 14.

The wavelength conversion device WC of the present embodiment includes the phosphor plate 14 having the light-receiving surface S1 from which the primary light L1 is incident and the light-emitting surface S2 on the side opposite to the light-receiving surface S1 and increasing the wavelength of at least a part of the primary light L1, and, the antenna array portions 15 (first regions) where the antenna array in which the plurality of minute antennas 15A are periodically arranged is formed on the light-emitting surface S2 of the phosphor plate 14, and the non-antenna array portions 16 (second regions) in which the antenna array is not formed. As illustrated in FIG. 4, since the recessed portion DP having a flat-shaped (bath-tub type) bottom surface is disposed in the non-antenna array portion 16, the thickness (distance Tb between the light-receiving surface Slb and the light-emitting surface S2) of the phosphor plate 14 in the non-antenna array portion 16 is thinner than the thickness (distance Ta between the light-receiving surface Sla and the light-emitting surface S2) of the phosphor plate 14 in the antenna array portion 15, and the optical path length in the phosphor plate of the primary light is made short.

Since the phosphor plate 14 in the antenna array portion 15 is thick, the optical path length of the primary light L1 that is incident is long, and a large part of the primary light L1 is converted to the secondary light L2 (yellow phosphor light) and reaches the light-emitting surface S2 of the antenna array portion 15. The primary light L1 (blue light) used as the illumination light is mainly extracted from the non-antenna array portions 16 in which the antenna array is not formed, and therefore can be extracted outside without the loss caused by the antenna array. Thus, the proportion of the primary light L1 (blue light) that is conventionally absorbed, reflected, and lost by the antenna array can be decreased, and the light extraction efficiency of the wavelength conversion device WC can be expected to improve. Accordingly, the above-described first problem can be expected to be solved.

Furthermore, even when there is a variation in the phosphor extraction efficiency due to the thickness of the phosphor plate 14 or the antenna array as in the conventional case, by later adjusting the thickness and the formed range (occupancy) of the non-antenna array portion 16, the ratio between the primary light L1 and the secondary light L2 can be adjusted to obtain the desired color temperature and chromaticity. Accordingly, the above-described second problem can be expected to be solved.

(Modification)

Figure 5:
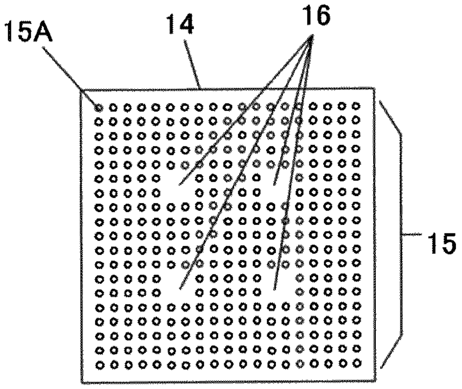
FIG. 5 is a front view of a modification of the wavelength conversion device in the illumination device according to Embodiment 1.
Figure 6:
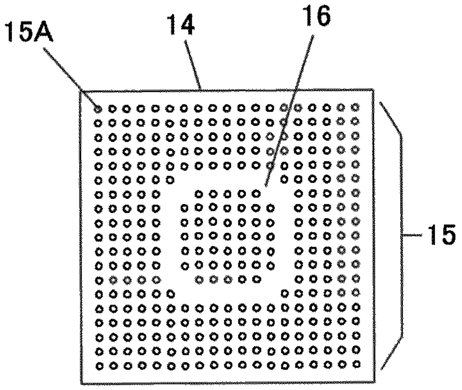
FIG. 6 is a front view of a modification of the wavelength conversion device in the illumination device according to Embodiment 1.
Figure 7:
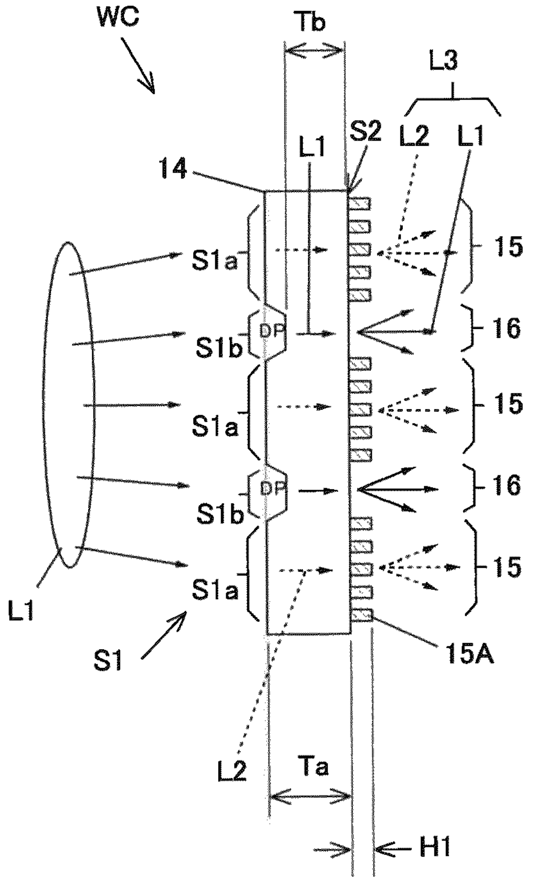
FIG. 7 is a schematic cross-sectional view illustrating a configuration of a modification of the wavelength conversion device in Embodiment 1.
Figure 8:
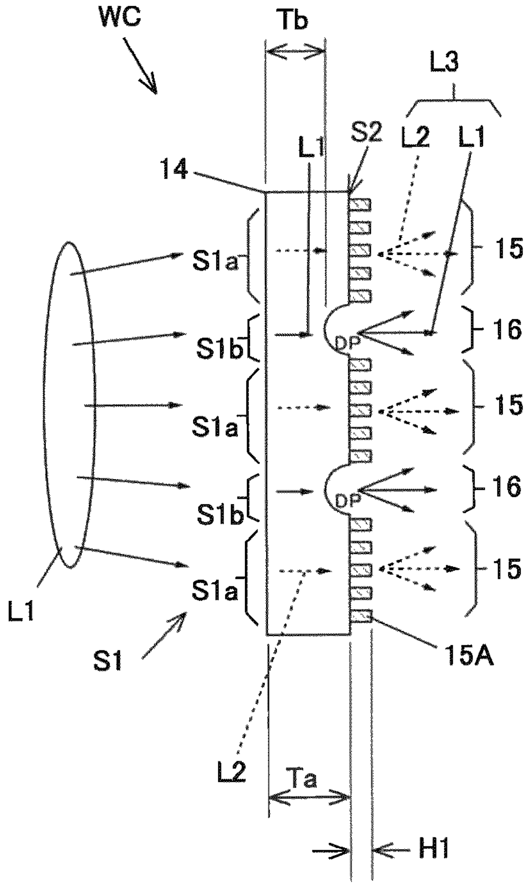
FIG. 8 is a schematic cross-sectional view illustrating a configuration of a modification of the wavelength conversion device in Embodiment 1.
Figure 9:
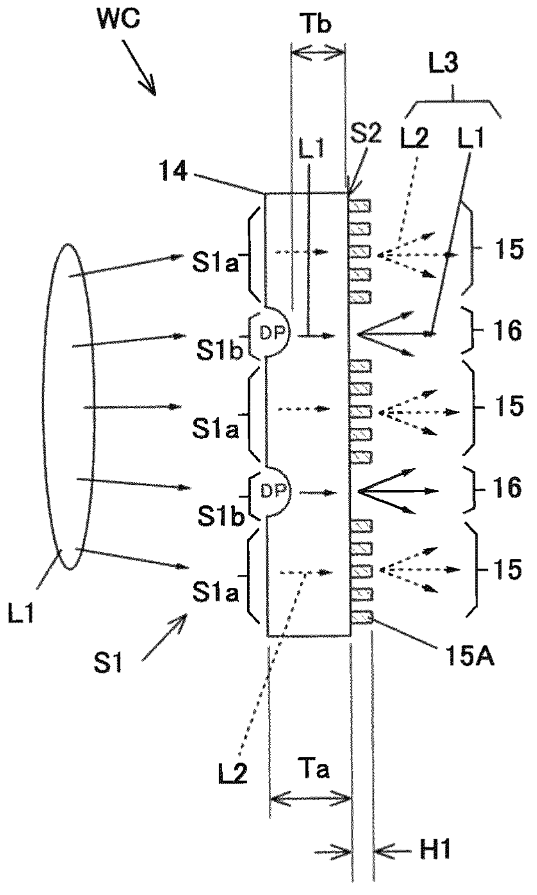
FIG. 9 is a schematic cross-sectional view illustrating a configuration of a modification of the wavelength conversion device in Embodiment 1.

FIG. 5 and FIG. 6 are front views of Modifications 1 and 2 of the wavelength conversion device in the illumination device according to Embodiment 1.

The occupation area ratio between the antenna array portion 15 and the non-antenna array portion 16 can be conveniently adjusted depending on the desired color temperature and chromaticity. For example, when mixing the blue light of the light source 13 and the yellow light of the phosphor plate 14 to obtain a general white illumination light having a color temperature of 5500 to 6500 K, the occupation area ratio of the non-antenna array portion 16 is preferably in a range of 2% or more and 50% or less. For example, when the phosphor plate in the non-antenna array portion 16 has a thickness of 100 μm, 140 μm, and 180 μm, by adjusting the occupation area of the non-antenna array portion in a range of to 15%, 10 to 25%, and 20 to 40%, respectively, a white illumination light having a color temperature of 5500 to 6500 K can be obtained.

Furthermore, also regarding the arrangement of the antenna array portions 15 and the non-antenna array portions 16, in addition to forming the non-antenna array portions 16 in a stripe form as in FIG. 2, as Modification 1, a plurality of the non-antenna array portions 16, such as 4 pieces, may be arranged as square or circular windows so as to be surrounded by the antenna array portions 15 as illustrated in FIG. 5. Also, as Modification 2, the non-antenna array portion 16 may be arranged as an annular window surrounded by the antenna array portions 15 as illustrated in FIG. 6.

The window size per non-antenna array portion 16 is, for example, 1 μm or more. A stripe having a width of 1 μm or more, which is sufficiently larger than the wavelength of the primary light L1 (blue light, approximately 450 nm), allows sufficiently extracting the primary light L1. From the viewpoint of suppressing color unevenness on the light-emitting surface S2, it is preferable to uniformly distribute and dispose many windows of the non-antenna array portions 16 having an occupation area that is as small as possible. For example, by setting the maximum width (diameter) per non-antenna array portion 16 as 50 μm or less, or preferably 10 μm or less, or setting the occupation area per non-antenna array portion 16 as 5% or less of the entire light-emitting surface S2, the difference in chromaticity between adjoining antenna array portions 15 can be made inconspicuous.

FIG. 7 to FIG. 13 are schematic cross-sectional views of Modifications 3 to 9 of the wavelength conversion device in the illumination device according to Embodiment 1.

In Embodiment 1, the recessed portion DP was formed as the non-antenna array portion 16 on the light-emitting surface S2 side of the wavelength conversion device WC. However, it is not limited to this, and as Modification 3, the recessed portion DP may be formed on the light-receiving surface S1 side to change the thickness of the phosphor plate 14 in the non-antenna array portion 16 while making the light-emitting surface S2 a flat surface (see FIG. 7). Thus, for example, it becomes easier to install an anti-reflective film, a microlens, or the like (not illustrated) on the surface of the phosphor plate 14 on the light-emitting surface S2 side of the non-antenna array portion 16, and the extraction efficiency and the light distribution of the primary light L1 can be controlled. Accordingly, the above-described first problem can 5 be expected to be solved. Moreover, by installing the anti-reflective film and the microlens, the extraction efficiency of the secondary light L2 extracted from the non-antenna array portion 16 can be adjusted, which also allows making the difference in chromaticity between adjoining antenna array portions 15 to become inconspicuous.

Furthermore, the recessed portion DP formed on the light-emitting surface S2 side of the non-antenna array portion 16 need not have a bottom surface in a flat shape (bath-tub type) as described above, and as Modification 4, may have a cross-sectional shape that is a dome (U-letter) shape (see FIG. 8), a V-letter shape, or a rough surface. These are advantageous in that the shapes allow the light distribution of the primary light L1 extracted from the light-emitting surface S2 to be finely adjusted. In other words, the light distribution characteristics of the primary light L1 can be corrected according to the light distribution characteristics of the secondary light L2 imparted by the antenna array portion 15. Accordingly, the above-described second problem can be expected to be solved. Note that, as Modification 5, the recessed portion DP having a dome (U-letter) shape may be formed on the light-receiving surface S1 side to change the thickness of the phosphor plate 14 in the non-antenna array portion 16 while the light-emitting surface S2 is made a flat surface (see FIG. 9).

Figure 10:
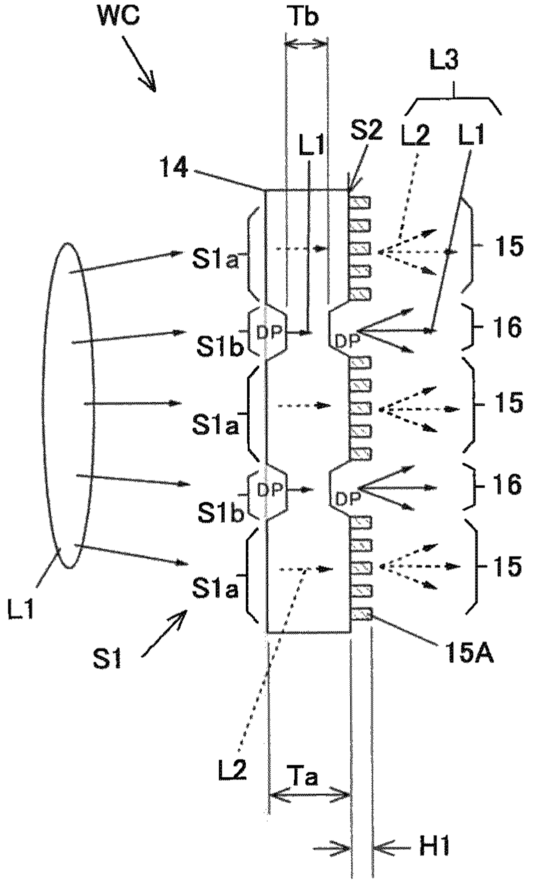
FIG. 10 is a schematic cross-sectional view illustrating a configuration of a modification of the wavelength conversion device in Embodiment 1.
Figure 11:
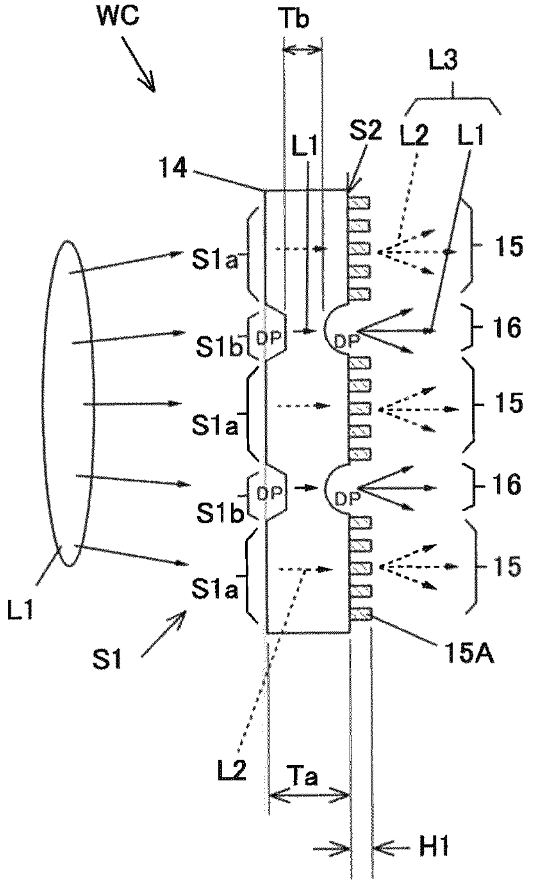
FIG. 11 is a schematic cross-sectional view illustrating a configuration of a modification of the wavelength conversion device in Embodiment 1.
Figure 1:
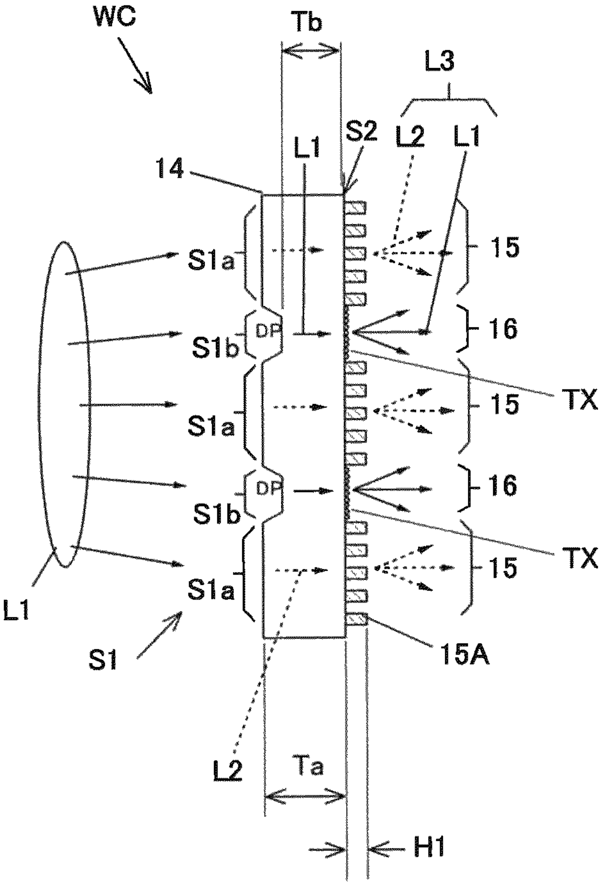

Furthermore, as Modifications 6 and 7 in which Modifications 1 to 5 are combined, as illustrated in FIG. 10 and FIG. 11, the thickness of the phosphor plate 14 in the non-antenna array portion 16 may be changed by forming the recessed portions DP having similar or different cross-sectional shapes on the light-emitting surface S2 side and the light-receiving surface S1 side.

As in Modifications 3 to 7 (FIG. 7 to FIG. 11), by the recessed portion DP being formed on at least one of the non-antenna array portions 16 or the portions Slb on the light-receiving surface S1 opposed to the non-antenna array portion 16, the directivity and the extraction efficiency of the primary light L1 can be improved.

In Modifications 3 and 5 (see FIG. 7 and FIG. 9), the recessed portion DP is formed in the portion Slb of the light-receiving surface S1 opposed to the non-antenna array portion 16, and the light-emitting surface S2 of the non-antenna array portion 16 is described as a flat surface having nothing thereon. Here, as Modification 8, instead of the flat surface in Modifications 3 and 5, a lens array pattern may be provided, or the surface of the phosphor plate 14 in the non-antenna array portion 16 may be a rough surface, or the flat surface may be processed into a lens shape or the like. In Modification 8, as illustrated in FIG. 12, a lens or a structure having a rough surface shape is formed using transparent members, such as glass, resin, or ceramics, on the flat surface of the non-antenna array portion 16 of the phosphor plate 14, and an optical path change surface TX made of recesses and protrusions that are lower than the antenna 15A is provided. Modification 8 allows the directivity of the primary light L1 to become closer to the secondary light L2 discharged from the antenna array portion 15. Moreover, since Modification 8 also allows adjusting the extraction efficiency and the directivity of the secondary light L2 discharged from the non-antenna array portion 16, for example, the effect of reducing color unevenness can also be expected. In other words, a modification of the present embodiment also includes a case where, in the non-antenna array portion 16, when the recessed portion DP is formed on the portion Slb of the light-receiving surface S1 opposed to the non-antenna array portion 16, the optical path change surface TX made of recesses and protrusions that are lower than the plurality of antennas are formed on the flat surface of the light-emitting surface S2.

Figure 13:
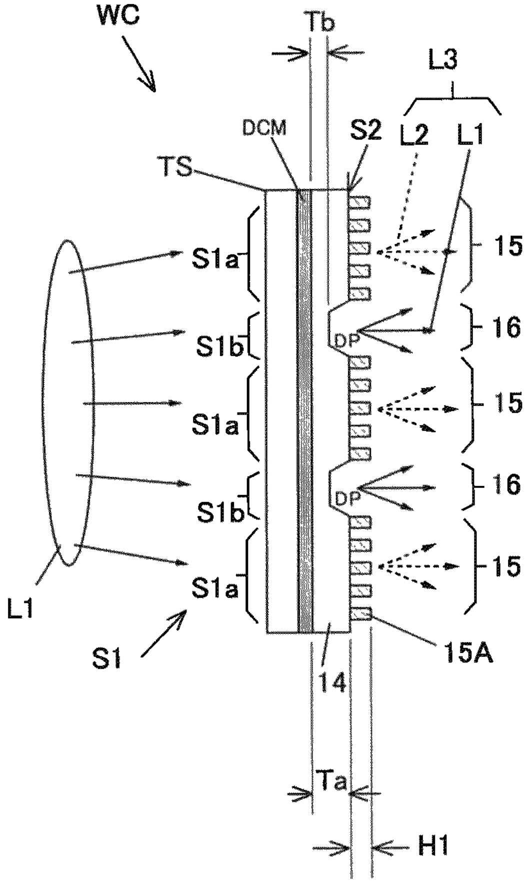
FIG. 13 is a schematic cross-sectional view illustrating a configuration of a modification of the wavelength conversion device in Embodiment 1.

FIG. 13 is a schematic cross-sectional view illustrating a wavelength conversion device of Modification 9 of the present embodiment.

The wavelength conversion device WC of Modification 9 is constituted of the phosphor plate 14 that is provided with the light-emitting surface S2 and converts the wavelength of the primary light L1, and a transparent support body TS that is provided with the light-receiving surface S1 and supports the phosphor plate 14 sandwiching a dichroic mirror DCM.

In order to improve heat radiation performance and mechanical strength of the wavelength conversion device WC, the transparent support body TS can be joined to the light-receiving surface S1 side of the phosphor plate 14. At this time, the phosphor plate 14 and the transparent support body TS may be joined via the dichroic mirror DCM through which the primary light L1 is transmitted and by which the secondary light L2 is reflected. Thus, the rear side of the secondary light L2 (light-receiving surface S1 side) can be reflected on the light-emitting surface S2 side to be used as the illumination light, and therefore can contribute to improving the efficiency of the wavelength conversion device WC. Furthermore, although not illustrated, an anti-reflective film (AR coat) can be formed on the surface (light-receiving surface S1) of the transparent support body TS to improve the incidence efficiency of the primary light L1.

For the joining, an adhesive layer made of resin, low-melting-point glass, or the like, can be disposed between the phosphor plate 14 and the transparent support body TS. In addition, by using a direct joining technique, a chemical bond can be formed at the interface between the phosphor plate 14 and the transparent support body TS or between the phosphor plate 14 and the dichroic mirror DCM. Thus, a wavelength conversion device WC that has heat radiation performance higher than in the case of using resin or glass can be obtained.

Figure 14:
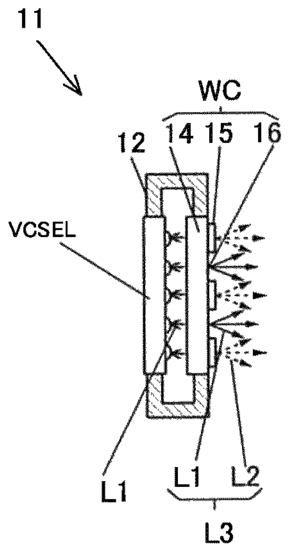
FIG. 14 is a schematic cross-sectional view illustrating an illumination device of a modification combined with a light source array in Embodiment 1.
Figure 15:
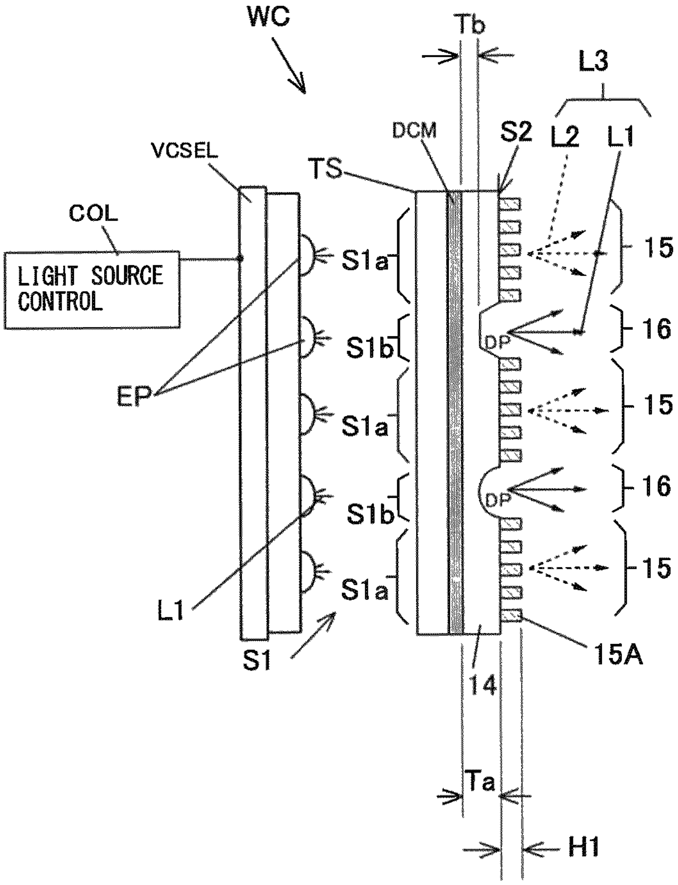
FIG. 15 is a schematic cross-sectional view illustrating a light source array and a wavelength conversion device of a modification combined with the light source array in Embodiment 1.

FIG. 14 is a schematic cross-sectional view illustrating the illumination device combined with a light source array of Modification 9 of the present embodiment. FIG. 15 is a schematic cross-sectional view illustrating the light source array and the wavelength conversion device in Modification 9 of the present embodiment.

Here, the third problem will be described. In order to obtain a target illumination color (color temperature), a mixing ratio between the primary light as the excitation light and the secondary light as the converted light needs to be adjusted, which requires precise control of the phosphor composition of the phosphor plate and the phosphor plate thickness. In addition to that, the color temperature might vary depending on the finish of the antenna array. This is because the loss and the light extraction efficiency of each the primary light and the secondary light fluctuate according to the antenna design and the shape uniformity of the antenna structure at the time of manufacture. Therefore, it is difficult to adjust the mixing ratio between the primary light and the secondary light.

In the description of the devices illustrated in FIG. 1 to FIG. 13, an illumination device that uses one ordinary semiconductor laser (EEL) has been described, but the phosphor plate 14 of the wavelength conversion device may be excited by a plurality of laser light sources 13, that is, a laser array (light source array). For example, FIG. 14 is an illumination device using a VCSEL array made of a vertical cavity surface emitting laser of a plurality of light-emitting portions as the light source 13. The respective light-emitting portions EP of the VCSEL array are arranged such that each of them is opposed to each of the antenna array portions 15 and the non-antenna array portions 16 for allowing all of the antenna array portions 15 and the non-antenna array portions 16 to be irradiated.

The respective light-emitting portions are disposed such that the optical axes of the light beams from the respective light-emitting portions are perpendicular to the portions Sla and the portions Slb. Each of the light-emitting portions EP includes a light-emitting portion in which light is mainly incident on the portion Sla and a light-emitting portion in which light is mainly incident on the portion Slb. According to Modification 9, by changing the outputs of the light-emitting portions EP even after the wavelength conversion device WC has been manufactured, the mixing ratio between the primary light L1 and the secondary light L2 can be conveniently adjusted even after the wavelength conversion device WC has been manufactured to obtain an illumination light having the desired color temperature and chromaticity. Accordingly, the above-described third problem can be expected to be solved. Furthermore, the wavelength conversion device WC provided with a plurality of regions of the antenna array portions 15 having different structures and/or the non-antenna array portions 16 having the recessed portions DP of different shapes obtains an effect of conveniently changing the settings of the color temperature and the light distribution characteristics of the illumination device while the illumination device is driven by the light source control device COL that controls the VCSEL array.

Figure 16:
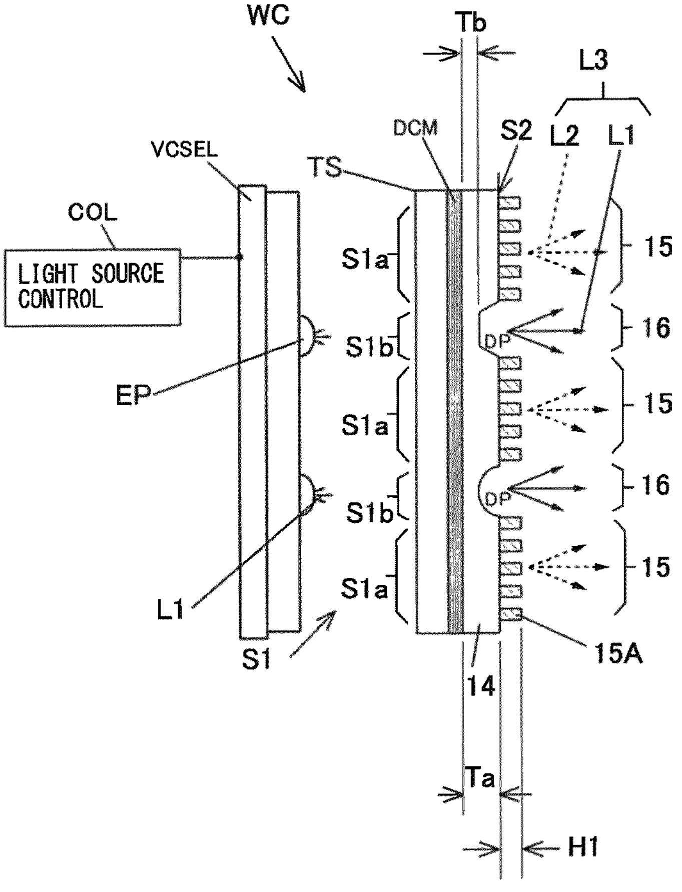
FIG. 16 is a schematic cross-sectional view illustrating a light source array and a wavelength conversion device of a modification combined with the light source array in Embodiment 1.

FIG. 16 is a schematic cross-sectional view of the light source array and the wavelength conversion device in Modification 10 of the present embodiment.

In Modification 9, the VCSEL array of the light source is disposed to be opposed to all of the antenna array portions 15 and the non-antenna array portions 16. However, it is not limited to this, and as illustrated in FIG. 16, for example, the light-emitting portions EP of the VCSEL array may be configured to be disposed such that the primary light L1 is not incident (or is incident by a relatively small amount) on the antenna array portions 15 (portions Sla), and is only incident (or is incident by a relatively large amount) on the non-antenna array portions 16 (portions S1*b*) (a part thereof). In other words, the secondary light L2 (fluorescent light) that is wavelength-converted from the primary light L1 in the non-antenna array portion 16 can be reflected in the phosphor plate 14, repeatedly propagated, and reach the antenna array on the light-emitting surface S2 of the antenna array portion 15. Therefore, if a desired color temperature and chromaticity can be obtained, the primary light L1 need not be incident on the antenna array portion 15.

However, in the case of the present Modification, the phosphor plate 14 has a constant thickness even in the non-antenna array portions 16, and the wavelength conversion needs to be performed.

Thus, the primary light L1 to be absorbed in the antenna array portion 15 is gone (or decreased), and therefore a highly efficient directive illumination device can be provided.

Embodiment 2

Figure 17:
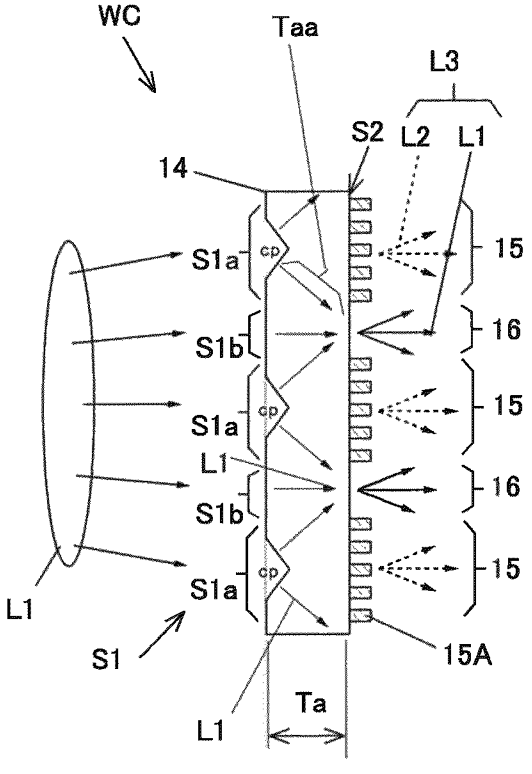
FIG. 17 is a schematic cross-sectional view illustrating a configuration of a wavelength conversion device in an illumination device according to Embodiment 2.

FIG. 17 is a drawing illustrating a configuration of the illumination device 11 according to Embodiment 2.

Embodiment 2 is the same as Embodiment 1 in that it includes the phosphor plate 14 having the light-receiving surface S1 to which the primary light L1 (excitation light) is incident and the light-emitting surface S2 on a side opposite to the light-receiving surface S1 and increasing the wavelength of at least a part of the primary light L1, and, the antenna array portions 15 where the antenna array in which the antennas 15A are periodically arranged is formed on the light-emitting surface S2 of the phosphor plate 14, and the non-antenna array portions 16 in which the antenna is not formed on the light-emitting surface S2 of the phosphor plate 14. Embodiment 2 is different from Embodiment 1 in that the portion Sla of the light-receiving surface S1 on a side opposite to the light-emitting surface S2 of the antenna array portion 15 has an inclined surface cp that changes the traveling direction of the primary light L1. In other words, in Embodiment 2, the change surface cp (inclined surface) allows the portion Sla of the light-receiving surface S1 opposed to the antenna array portion 15 to change the optical path of the primary light L1 to the non-antenna array portion 16 such that the optical path length of the primary light L1 from the portion Sla (inclined surface cp, such as a triangular cross-sectional groove or a conical groove) of the light-receiving surface S1 to the light-emitting surface S2 of the non-antenna array portion 16 is longer than the optical path length of the primary light L1 from the portion Slb of the light-receiving surface S1 to the light-emitting surface S2 of the non-antenna array portion 16 (Taa>Ta).

The wavelength conversion device WC of Embodiment 2 has the same features as Embodiment 1 other than the fact that it includes the inclined surfaces (change surfaces) that change the traveling direction of the primary light L1 to the end surface direction (direction parallel to the light-emitting surface S2) of the phosphor plate 14 on the light-receiving surface S1 side of the antenna array portions 15. The inclined surface cp is formed on at least parts (portions Sla) of the light-receiving surface S1 on a side opposite to the side on which the antenna array portions 15 are formed, and therefore the primary light L1 proceeding perpendicularly toward the antenna array portion 15 on the light-emitting surface S2 from the portion Sla is avoided. Thus, the optical path of the primary light L1 can be made longer without increasing the thickness (distance Ta between the light-receiving surface Sla and the light-emitting surface S2) of the antenna array portion 15 like in Embodiment 1, and the loss caused by the antenna array portion 15 can be decreased.

The ceramic material, such as YAG:Ce, used for the phosphor plate 14 has a relatively high refractive index, and when the primary light L1 is incident on the phosphor plate 14, the primary light L1 is largely refracted in the normal line direction of the light-receiving surface S1. Therefore, in Embodiment 2, due to the light-receiving surface S1 on the side opposite to the antenna array portions 15 being made as the inclined surface (change surface), the primary light L1 that is incident from the antenna array portions 15 is refracted in the end surface direction of the phosphor plate 14, and the optical path length of the primary light L1 that reaches the light-emitting surface S2 is increased. Therefore, most of the primary light L1 that is incident from the antenna array portions 15 is converted to the secondary light L2 and reaches the light-emitting surface S2 before being absorbed or reflected by the antenna array portions 15. Accordingly, the above-described first problem can be expected to be solved.

In the device illustrated in FIG. 17, the inclined surface (change surface) of the portion Sla of the light-receiving surface S1 opposed to the antenna array portion 15 is a cross-sectional surface having a V-letter shape. However, it is not limited to this, and the inclined surface (change surface) may have a cross-sectional shape, such as a serrated surface, a curved surface, or a rough surface, which can change the traveling direction of at least a part of the primary light L1 to the lateral direction (to the non-antenna array portion 16). The non-antenna array portion 16 need only have a thickness that allows the primary light L1 to be extracted, and a recessed portion (not illustrated) similar to the portion DP of Embodiment 1 can be disposed on the light-emitting surface S2 or the light-receiving surface S1.

Figure 18:
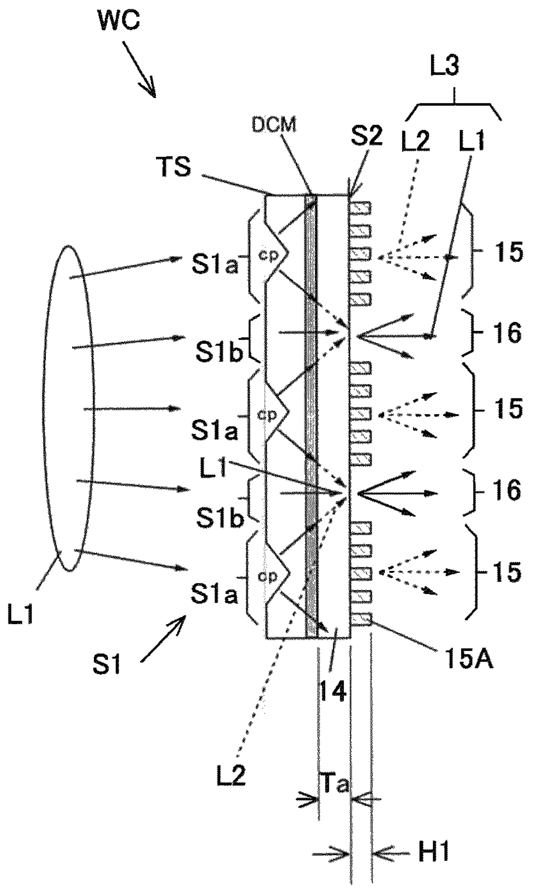
FIG. 18 is a schematic cross-sectional view illustrating a configuration of a modification of the wavelength conversion device in the illumination device according to Embodiment 2.

FIG. 18 is a schematic cross-sectional view illustrating the wavelength conversion device in Modification 1 of the present Embodiment.

In Embodiment 2, similarly to Modification 9 of Embodiment 1 (see FIG. 13), the transparent support body TS can be joined in order to improve heat radiation performance and mechanical strength. In this case, in Modification 1 of Embodiment 2, the inclined surface (change surface cp) is formed not on the phosphor plate 14, but instead on the portions Sla of the light-receiving surface S1 of the transparent support body TS.

The transparent support body TS preferably has a refractive index that is approximately the same or less than that of the phosphor plate 14. When the refractive index of the transparent support body TS is too high with respect to the phosphor plate 14 or the dichroic mirror DCM, the primary light L1 that is totally reflected at the interface between the phosphor plate 14 and the transparent support body TS and is incident on the phosphor plate 14 decreases. Therefore, the transparent support body TS is preferably a sapphire (alumina) plate having the close refractive index and has a high thermal conductivity, or a YAG substrate in which Ce as a luminescence center is not doped may be used. In addition to the refractive index, a thermal expansion coefficient of the YAG substrate is also almost the same as that of the phosphor plate 14 (YAG:Ce) and therefore the phosphor plate 14 and the transparent support body TS are unlikely to be peeled off when operating at a high temperature, which is preferable.

In the above Embodiments 1, 2, and Modifications, the light source and the phosphor plate 14 or the transparent support body TS that supports the phosphor plate 14 are configured such that the light-emitting surface S2 of the phosphor plate 14 includes the antenna array portions 15 and the non-antenna array portions 16, and regarding the primary light L1 from the light source and the secondary light L2 that is wavelength-converted by the phosphor plate 14, a relatively larger amount of the secondary light L2 reaches the antenna array portions 15 and interacts with the antenna array, and a relatively larger amount of the primary light L1 reaches the non-antenna array portions 16 and is emitted.

The optical path length of the primary light L1 that is incident on the phosphor plate and reaches the light-emitting surface S2 is relatively long in the antenna array portion 15 and is relatively short in the non-antenna array portion 16.

Here, the optical path length is an average optical path length of light that reaches the light-emitting surface S2.

Accordingly, the absorption or reflection of the primary light L1 caused by the antenna array can be suppressed and the light extraction efficiency can be improved.

DESCRIPTION OF REFERENCE SIGNS

11 Illumination device
12 Casing
13 Light source
14 Phosphor plate
15 Antenna array portion
16 Non-antenna array portion
WC Wavelength conversion device
DP Recessed portion
L1 Primary light
L2 Secondary light
S1 Light-receiving surface
S2 Light-emitting surface
TX Optical path change surface
DCM Dichroic mirror
TS Transparent support body

The invention claimed is:

1. A wavelength conversion device comprising:

a wavelength converter having a plate shape, the wavelength converter having a light-receiving surface and a light-emitting surface, the wavelength converter converting a wavelength of incident light that is incident from the light-receiving surface and generates a wavelength-converted light, the wavelength converter emitting the wavelength-converted light from the light-emitting surface; and a plurality of antennas disposed on the light-emitting surface of the wavelength converter, wherein the plurality of antennas form an antenna array in a first region of the light-emitting surface, the respective plurality of antennas are arranged with a predetermined period in the first region, and the antenna array is absent in a second region outside the first region, and an optical path length from the light-receiving surface to the light-emitting surface of the incident light that reaches a light-emitting surface of the first region is longer than an optical path length from the light-receiving surface to the light-emitting surface of the incident light that reaches a light-emitting surface of the second region.

2. The wavelength conversion device according to claim 1, wherein a distance between a part of the light-receiving surface opposed to the first region of the light-emitting surface and the first region is greater than a distance between a part of the light-receiving surface opposed to the second region of the light-emitting surface and the second region.

3. The wavelength conversion device according to claim 2, wherein a recessed portion is formed in at least one of the second region and a part of the light-receiving surface opposed to the second region.

4. The wavelength conversion device according to claim 3, wherein when the recessed portion is formed in the part of the light-receiving surface opposed to the second region, an optical path change surface made of a recess and protrusion that are lower than the plurality of antennas is formed on a flat surface of the light-emitting surface in the second region.

5. The wavelength conversion device according to claim 3, wherein a bottom surface of the recessed portion is formed parallel to the first region of the light-emitting surface.

6. The wavelength conversion device according to claim 1, wherein a part of the light-receiving surface opposed to the first region is a change surface that changes an optical path of the incident light to the second region.

7. The wavelength conversion device according to claim 6, wherein the change surface is an inclined surface, a serrated surface, a curved surface, or a rough surface.

8. The wavelength conversion device according to claim 1, wherein the wavelength converter is constituted of a phosphor plate that is provided with the light-emitting surface and converts a wavelength of the incident light, and a transparent support body that is provided with the light-receiving surface and supports the phosphor plate sandwiching a dichroic mirror.

9. An illumination device comprising:

the wavelength conversion device according to claim 1; and a light source that generates light to be incident on the wavelength converter.

10. The illumination device according to claim 9, wherein the light source is a laser light source that generates laser light.

11. The illumination device according to claim 9, wherein the laser light source is a light source array made of an array of a plurality of light-emitting portions that emit light toward the first region and the second region.

12. The illumination device according to claim 9, wherein the laser light source is a light source array made of an array of a plurality of light-emitting portions that emit light toward the second region.

13. The illumination device according to claim 9, wherein the light source is constituted of a light-emitting diode and a condensing optical system that adjusts light distribution of light from the light-emitting diode to generate the incident light.

14. An illumination device comprising a light source and a wavelength conversion device, wherein the wavelength conversion device includes a wavelength converter having a plate shape, the wavelength converter has a light-receiving surface and a light-emitting surface, the wavelength converter converts a wavelength of incident light that is incident from the light-receiving surface and generates a wavelength-converted light, the wavelength converter emits the wavelength-converted light from the light-emitting surface, and a plurality of antennas are disposed on the light-emitting surface of the wavelength converter, the plurality of antennas form an antenna array in which the respective plurality of antennas are arranged with a predetermined period in a first region of the light-emitting surface, and the antenna array is absent in a second region outside the first region, and when the light source irradiate the light-receiving surface of the wavelength converter with a primary light, the wavelength converter converts a wavelength of a part of the primary light and generates a secondary light, the primary light and the secondary light having passed the wavelength converter reaches the light-emitting surface, and a relatively large amount of the secondary light reaches the first region, while a relatively large amount of the primary light reaches the second region.

* * * * *